United States Patent
Wang

(10) Patent No.: US 7,467,116 B2
(45) Date of Patent: Dec. 16, 2008

(54) INCREMENTAL DATA FUSION AND DECISION MAKING SYSTEM AND ASSOCIATED METHOD

(75) Inventor: Yuan-Fang Wang, Goleta, CA (US)

(73) Assignee: Proximex Corporation, Cupertino, CA (US)

( * ) Notice: Subject to any disclaimer, the term of this patent is extended or adjusted under 35 U.S.C. 154(b) by 236 days.

(21) Appl. No.: 11/230,932

(22) Filed: Sep. 19, 2005

(65) Prior Publication Data

US 2006/0112039 A1    May 25, 2006

Related U.S. Application Data

(60) Provisional application No. 60/610,916, filed on Sep. 17, 2004.

(51) Int. Cl.
  *G06E 1/00* (2006.01)
  *G06E 3/00* (2006.01)
  *G06F 15/18* (2006.01)
  *G06G 7/00* (2006.01)

(52) U.S. Cl. ..................................................... 706/20
(58) Field of Classification Search ........................ None
  See application file for complete search history.

(56) References Cited

U.S. PATENT DOCUMENTS

| | | | |
|---|---|---|---|
| 5,479,574 A | | 12/1995 | Glier et al. |
| 5,701,398 A | | 12/1997 | Glier et al. |
| 5,769,074 A | | 6/1998 | Barnhill et al. |
| 5,835,901 A | * | 11/1998 | Duvoisin et al. ............... 706/19 |
| 6,006,179 A | * | 12/1999 | Wu et al. .................... 704/222 |
| 6,016,384 A | * | 1/2000 | Gallo ......................... 706/25 |
| 6,023,693 A | * | 2/2000 | Masuoka et al. ............... 706/25 |
| 6,248,063 B1 | | 6/2001 | Barnhill et al. |
| 6,306,087 B1 | | 10/2001 | Barnhill et al. |
| 6,513,024 B1 | * | 1/2003 | Li ............................... 706/45 |
| 6,621,936 B1 | * | 9/2003 | Kondo et al. ................. 382/260 |
| 6,751,364 B2 | * | 6/2004 | Haagensen et al. .......... 382/313 |
| 6,757,668 B1 | * | 6/2004 | Goebel et al. ................. 706/59 |
| 6,763,136 B1 | * | 7/2004 | Sweet ......................... 382/197 |
| 6,778,702 B1 | * | 8/2004 | Sweet ......................... 382/191 |
| 6,804,400 B1 | * | 10/2004 | Sharp ......................... 382/239 |
| 6,810,086 B1 | * | 10/2004 | Puri et al. .............. 375/240.29 |
| 6,850,949 B2 | * | 2/2005 | Warner et al. ................ 707/101 |
| 6,891,961 B2 | * | 5/2005 | Eger et al. ................... 382/110 |
| 6,909,745 B1 | * | 6/2005 | Puri et al. .............. 375/240.01 |
| 6,963,899 B1 | * | 11/2005 | Fernandez et al. .......... 709/203 |
| 6,968,006 B1 | * | 11/2005 | Puri et al. .............. 375/240.08 |

(Continued)

OTHER PUBLICATIONS

Just-in-Time Adaptive Classifiers—Part I: Detecting Nonstationary Changes Alippi, C.; Roveri, M.; Neural Networks, IEEE Transactions on vol. 19, Issue 7, Jul. 2008 pp. 1145-1153 Digital Object Identifier 10.1109/TNN.2008.2000082.*

(Continued)

*Primary Examiner*—Michael B Holmes
(74) *Attorney, Agent, or Firm*—Stephen C. Durant; Duane Morris LLP

(57) ABSTRACT

A computer implemented adaptive ensemble classifier is provided which includes: a plurality of classifiers; a decision structure that maps respective classifier combinations to respective classification decision results; and a plurality of respective sets of weights associated with respective classifier combinations.

13 Claims, 5 Drawing Sheets

U.S. PATENT DOCUMENTS

| | | | | |
|---|---|---|---|---|
| 6,970,513 | B1 * | 11/2005 | Puri et al. | 375/240.25 |
| 6,976,207 | B1 * | 12/2005 | Rujan et al. | 715/234 |
| 7,028,034 | B2 * | 4/2006 | Wesinger et al. | 707/10 |
| 7,127,464 | B2 * | 10/2006 | Wesinger et al. | 707/10 |
| 7,213,174 | B2 * | 5/2007 | Dahlquist et al. | 714/37 |
| 7,269,591 | B2 * | 9/2007 | Wesinger et al. | 707/10 |
| 7,277,485 | B1 * | 10/2007 | Puri et al. | 375/240.08 |
| 7,286,687 | B2 * | 10/2007 | Lindwurm et al. | 382/101 |
| 7,319,796 | B1 * | 1/2008 | Sharp | 382/248 |
| 7,366,174 | B2 * | 4/2008 | MacFaden et al. | 370/392 |

OTHER PUBLICATIONS

Mobile Phone-Enabled Museum Guidance with Adaptive Classification Bruns, Erich; Brombach, Benjamin; Bimber, Oliver; Computer Graphics and Applications, IEEE vol. 28, Issue 4, Jul.-Aug. 2008 pp. 98-102 Digital Object Identifier 10.1109/MCG.2008.77.*

A Critical Comparison of Two Kinds of Adaptive Classification Networks Steinbuch, K.; Widrow, B.; Electronic Computers, IEEE Transactions on vol. EC-14, Issue 5, Oct. 1965 pp. 737-740 Digital Object Identifier 10.1109/PGEC.1965.264219.*

Image subband coding using context-based classification and adaptive quantization Youngjun Yoo; Ortega, A.; Bin Yu; Image Processing, IEEE Transactions on vol. 8, Issue 12, Dec. 1999 pp. 1702-1715 Digital Object Identifier 10.1109/83.806617.*

Analytical Results on Style-Constrained Bayesian Classification of Pattern Fields Veeramachaneni, S.; Nagy, G.; Pattern Analysis and Machine Intelligence, IEEE Transactions on vol. 29, Issue 7, Jul. 2007 pp. 1280-1285 Digital Object Identifier 10.1109/TPAMI.2007. 1030.*

Adaptive Classification for Brain Computer Interfaces Blumberg, J.; Rickert, J.; Waldert, S.; Schulze-Bonhage, A.; Aertsen, A.; Mehring, C.; Engineering in Medicine and Biology Society, 2007. EMBS 2007. 29th Annual International Conference of the IEEE Aug. 22-26, 2007 pp. 2536-2539 Digital Object Identifier 10.1109/IEMBS.2007. 4352845.*

A Fast Matching Algorithm Based on Adaptive Classification Scheme Ce Fan; Peihua Liu; Cognitive Informatics, 2006. ICCI 2006. 5th IEEE International Conference on vol. 1, Jul. 17-19, 2006 pp. 541-546 Digital Object Identifier 10.1109/COGINF.2006. 365543.*

Utilizing Fused Features to Mine Unknown Clusters in Training Data Lynch, R.S.; Willett, P.K.; Information Fusion, 2006. ICIF '06. 9th International Conference on Jul. 2006 pp. 1-7 Digital Object Identifier 10.1109/ICIF.2006.301761.*

Freund, Y. et al., (1997) "A decision-theoretic generalization of on-line learning and an application to boosting," *Journal of Computer and System Sciences*, 55(1):119-139.

* cited by examiner

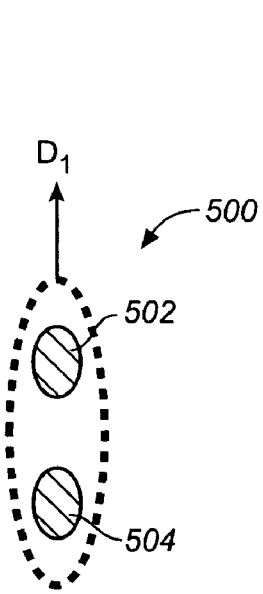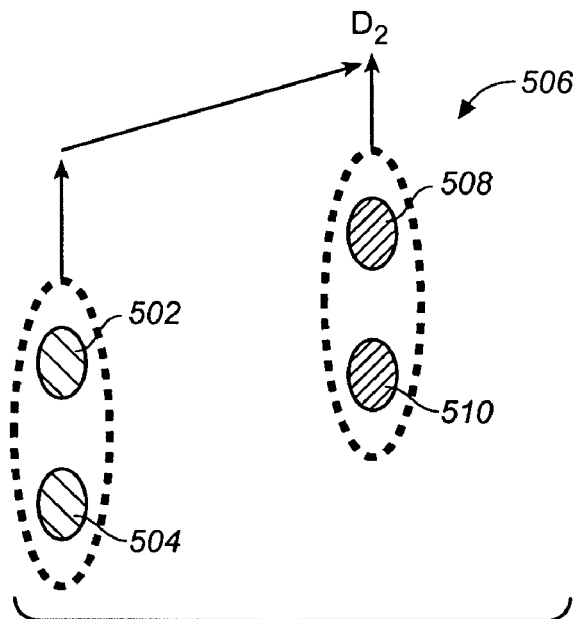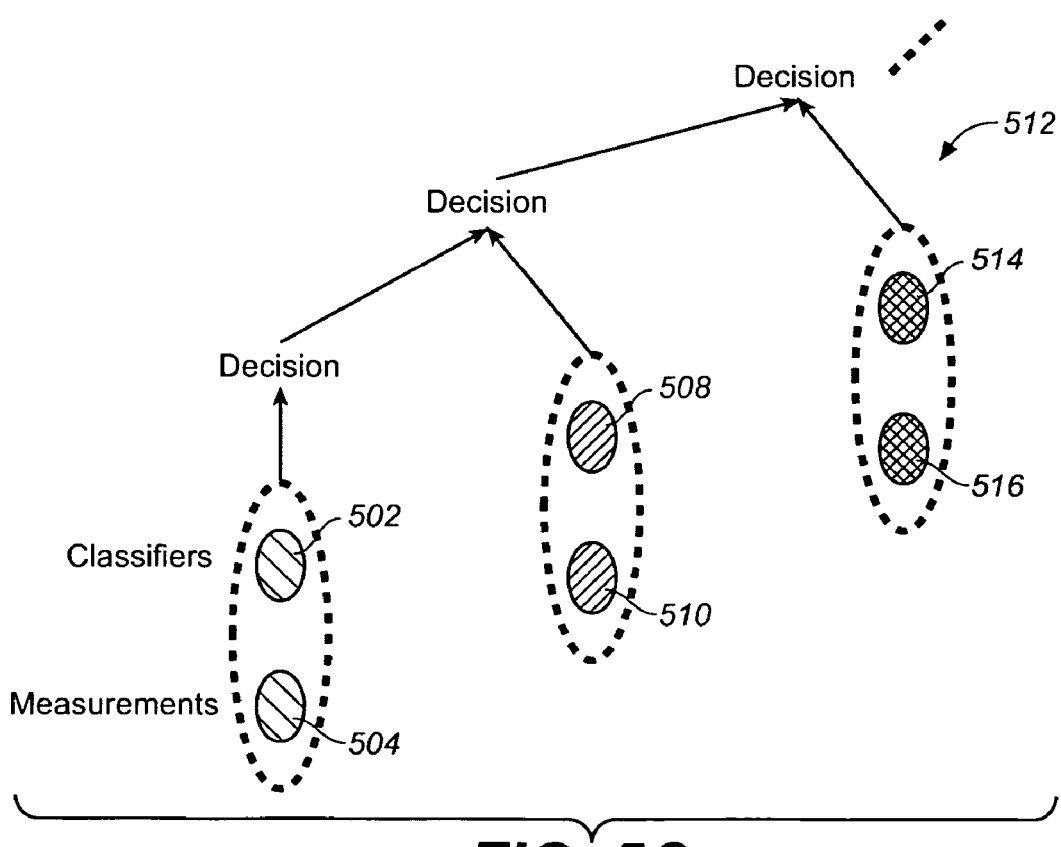
FIG. 5A
FIG. 5B
FIG. 5C

INCREMENTAL DATA FUSION AND DECISION MAKING SYSTEM AND ASSOCIATED METHOD

CROSS REFERENCE TO RELATED APPLICATION

The present application claims benefit of earlier filed provisional patent application, U.S. Application No. 60/610,916, filed on Sep. 17, 2004, and entitled "An Incremental Data Fusion and Decision Making Framework," which is hereby incorporated by reference as if fully set forth herein.

BACKGROUND OF THE INVENTION

1. Field of the Invention

The invention relates in general to classification of objects based upon information from multiple information sources and more particularly, to incremental data fusion and decision making based upon multiple information sources that become available incrementally.

2. Description of the Related Art

Consider the scenario in which a number of surveillance modules are available (e.g., face recognition, finger print, DNA profile). These modules have varying accuracy, speed, and cost of deployment. They provide different or similar "views" of the same surveillance subject, and hence, information provided from different sources may be correlated or uncorrelated, corroborating or contradicting, etc. The challenge is to use these sources in a judicious and synergistic manner to aid decision making. Similar application scenarios arise, for example, in determining credit worthiness of a loan or credit card applicant by examining multiple indicators, such as income, debt, profession, etc., and in detecting network intrusion by examining network traffic, IP addresses, port numbers, etc.

Two problems can arise when considering data fusion and decision making involving addition of a new data source and associated classifier to a decision process. A first problem involves determining whether it is even desirable to select an additional information source, and if so, which information source to use. A second problem involves determining the optimal way to incorporate the new information to update a current decision process. These problems, on the first glance, might appear to be a straightforward application in designing an ensemble classifier or a committee machine from component classifiers. Prior techniques, such as arching, bagging, and boosting, should be applicable. However, such prior techniques do not adequately address these problems.

Generally speaking, decision fusion frameworks differ in two important aspects: the composition of the training data and the mechanism of decision reporting. They can be roughly put in two categories: those based on decision fusion and those based on measurement (or data) fusion. As used herein, a classifier is a function module that has been trained to determine output classification prediction information based upon a prescribed set of input information. An ensemble classifier comprises multiple component classifiers.

FIG. 1 is an illustrative diagram of a prior decision fusion classifier 10. The process involves use of multiple classifiers $C_{df1}$-$C_{dfn}$ and multiple associated sets of measurement data $M_{df1}$-$M_{dfn}$. Each classifier performs a corresponding classification process producing a classification result, using its associated measurement data. For example, classifier $C_{df1}$ performs classification process 12 based upon measurement data $M_{df1}$, and produces a classification result $R_{df1}$. Similarly, classifiers $C_{df2}$-$C_{dfn}$ perform corresponding classification processes 14-18 to produce classification results $R_{df2}$-$R_{dfn}$ using corresponding measurement data $M_{df2}$-$M_{dfn}$. A decision $D_{df}$ is "fused" based upon the results $R_{df1}$-$R_{dfn}$.

When component classifiers $C_{df1}$-$C_{dfn}$ are trained on different measurement data $M_{df1}$-$M_{dfn}$ (e.g., some use fingerprints and some use face images), individual component classifiers are trained and consulted more or less independently. Information fusion often times occurs at the decision level (hence the term decision fusion). If for a given test subject, a component classifier (e.g., $C_{df1}$) reports only a result (e.g., $R_{df1}$) (a class label) with no supporting evidence, the best one can hopeful is some kind of majority rule. On the other hand, if the classifier reports a result with some associated confidence measure, then an aggregate decision $D_{df}$ can be some weighted combination of individual decisions (e.g., sum, max, min, median, and majority). It has been reported, somewhat surprisingly, that the simple sum rule outperforms many others in real-world experiments.

Unfortunately, simple decision fusion schemes typically do not address the problems identified above that can arise when not all component classifiers and not all data sets are made available at the same time. For example, gathering data from all possible sources can be a very expensive process—both in terms of time and cost. Often times, a decision of high confidence can be reached without consulting all information sources. Hence, it may be desirable to add a new additional data source and associated classifier to the decision process only when needed. The problems discussed above are whether to add a new classifier and new measurement data, and if so, which ones to add, and how to modify the decision process to accommodate the results produced by the new classifier.

While decision fusion schemes win for their simplicity, they represent a greedy, component-wise optimization strategy. More recently, other ensemble classifiers (such as bagging and boosting) that are based on measurement fusion principles and use a joint optimization strategy have become more popular. Intuitively speaking, a measurement fusion scheme has all component classifiers trained on data sets that comprise all available measurements to better exploit their joint statistical dependency. This represents a more global view of the measurement space, and hence, motivates the use of the term measurement fusion.

As a more concrete example of a measurement fusion scenario, denote a surveillance module (e.g., fingerprint) as s, and denote its measurement as a multi-dimensional random variable $x_s$ and its class assignment (e.g., a known employee who should be allowed access or an intruder) over some sample space as random variable $y_s$. Furthermore, denote $y_t$ as the ground truth (correct) label, which may or may not be the same as $y_s$. Traditional ensemble classifiers, such as ADAboost, operate in a batch mode by concatenating all source data into a big aggregate (X, $y_t$), X=($x_0, x_1, \ldots, x_{k-1}$), where k sources, $s_0, s_1, \ldots, s_{k-1}$, are used and $x_i$ is the measurement from the ith source. Hence, if n training data points are available, then training data set is represented as D=$\{(X_0, y_{t0}), (X_1, y_{t1}), \ldots, (X_{n-1}, y_{tn-1})\}$, where $X_i$=($x_{0,i}, x_{1,i}, \ldots, x_{k-1,i}$). Component classifiers are then trained on this aggregate representation.

Different measurement fusion training strategies can be used, but traditionally, they all involve altering the training datasets of the component classifiers in some principled way. For example, bagging partitions the n data points into subsets and gives a different subset to each component classifier for training. The ensemble label is then assigned based on a simple voting scheme. This represents a naive "parallel processing" approach to recognition and employs classifiers in a batch mode. Known boosting techniques such as, Boosting-by-filtering and ADAboost (Freund, Y. & Schapire, R. E. (1995), A decision-theoretic generalization of on-line learning and an application to boosting, in Proceedings of the 2nd European Conference on Computational Learning Theory (Eurocolt95), Barcelona, Spain, pp. 23-37), for example, adopt a strategy of employing component classifiers incrementally and only when needed. The composition of the training data set for later component classifiers is altered based on how difficult to classify a data point using the ensemble classifier constructed so far (data that are easier to classify have a smaller chance of being selected for future training).

FIG. 2 is an illustrative diagram of a prior measurement fusion classifier 20 using a "bagging" technique. In general terms, during a bagging classifier process, measurement data from multiple different sources 22-28 is classified using multiple different classifiers $C_{bag1}$-$C_{bagn}$. Unlike decision fusion, however, individual classifiers are not necessarily associated with measurement data from individual sources 22-28. Rather, the totality of the measurement data 30 is separated into separate data "bags" $M_{bag1}$-$M_{bagn}$, and each classifier $C_{bag1}$-$C_{bagn}$ is trained on its associated "bag" of data. This association of different classifiers with different bags of data is represented by the different cross-hatching in the arrows and corresponding cross-hatching of regions of the measurement data 22. For example, classifier $C_{bag1}$ classifies using data bag $M_{bag1}$; classifier $C_{bag2}$ classifies using data bag $M_{bag2}$; and classifier $C_{bagn}$ classifies using data bag $M_{bagn}$. A decision is reached based upon results $R_{bag1}$-$R_{bagn}$ produced by classifiers $C_{bag1}$-$C_{bagn}$.

FIG. 3 is an illustrative diagram of a prior measurement fusion classifier 30 using a "boosting" technique. In this example boosting process, boosting classifiers $C_{boost1}$-$C_{boostn}$ are trained on filtered measurement data. To understand the purpose of a boosting process, consider the following scenario. The decision to be made is to decide whether or not to issue a credit card to an applicant. Classifiers $C_{boost1}$-$C_{boost3}$ are trained to make a recommendation for any given applicant. Assume, for example, that ten million data sources 30-1 to 30-10M, each representing a credit card candidate, are considered during training of the classifiers. Assume that classifier $C_{boost1}$ is trained using all of the source data 32, to identify the 500,000 best and 500,000 worst candidates. Assume that a first filtered data set 34 is produced by removing (or making it less likely to select again for training) these one million data sources. In this example, classifier $C_{boost2}$ is trained using only the remaining nine million data sources 36-1 to 36-9M, to identify the next 1,000,000 best and the next 1,000,000 worst candidates. Assume that a second filtered data set 38 is produced by removing (or making it less likely to select again for training) these next two million data sources. In this example, classifier $C_{boost3}$ is trained using only the remaining seven million data sources 40-1 to 40-7M. Each of the boost classifiers $C_{boost1}$-$C_{boost3}$ produces a corresponding classification result $R_{boost1}$-$R_{boost3}$ in response to measurement data from a subject, such as a credit card applicant. A decision $D_{boost}$ is arrived at based upon the classification results.

While classification involving bagging or boosting generally have been successful, there have been shortcomings with their use. For example, boosting techniques require fine-tuning of the parameters of the component classifiers, which is an expensive in terms of processing effort and involves joint optimization of all component classifiers. This often is not feasible due to the cost and time constraints in surveillance applications, even when the training process is performed off-line. Furthermore, regardless of how data are filtered (as in boosting) or partitioned (as in bagging), data from all sources are assumed available in a batch for training, which is not the scenario considered by this particular application, where data are acquired incrementally and sources are queried as needed.

Decision-tree methods provide another decision making approach. These methods operate in a similar way to boosting and bagging by iteratively partitioning a measurement space into homogeneous cells. The partition is recorded in a tree structure. FIG. 4 is an illustrative drawing showing cells of a recorded tree structure in accordance with a prior decision-tree technique. During a decision-tree process using such a tree-structure, an unknown sample is filtered down the decision tree and assumes the label of the majority training samples in the particular leave cell the unknown sample happens to end up with. In the illustrated example of FIG. 4, the decision-tree is used for binary (yes/no) decisions. Samples that fall outside a cell, indicated as $R_1$ are labeled "no", and samples that fall inside a cell, indicated as $R_2$ are labeled "yes". Unfortunately, like bagging and boosting, a decision tree operates on the complete measurement space and does not consider the case where measurements are made available incrementally.

Thus, typical prior classification schemes are incremental either in the classifier dimension or the data dimension, but not both. Decision fusion schemes ordinarily partition data into subsets but aggregate information in a batch manner, with or without proper weighting. Measurement fusion schemes ordinarily introduce classifiers one at a time, but the data they train on are nonetheless "complete." That is, regardless of whether the global composition of the training set changes as a result of the training done so far, each training point in the set comprises measurements from all surveillance modules.

However, in reality, surveillance modules are employed incrementally (e.g., only when the face recognition module detects a suspicious person will that person be asked to undergo a fingerprint exam). Hence, decisions are made when only partial data are available. Furthermore, a current decision may be used not only for subject discrimination, but also for selecting new sources to query in an incremental manner. This raises doubt as to whether training results, derived based on the assumption of the availability of all decisions or all data, are applicable when only partial decisions or partial data are available for decision making.

Thus, there has been a need for an improvement incremental data fusion and decision making. The present invention meets this need.

SUMMARY OF THE INVENTION

One embodiment of the invention provides a computer implemented adaptive ensemble classifier. The ensemble includes a plurality of classifiers. A decision structure maps respective classification decision results to respective classifier combinations. The ensemble includes a multiple sets of weights each associated with a different respective classifier combination.

Thus, an ensemble classifier of the embodiment can be incrementally adapated based upon classifier decions. Different weights are used for different classifier configurations. Classifiers and associated measurement data can be added incrementally to the classifier-based decsion process.

These and other features and advantages of the invention sill be apparent from the following description of embodiments thereof in conjunction with the drawings.

BRIEF DESCRIPTION OF THE DRAWINGS

FIGS. 5A-5C are an illustrative diagrams of an adaptive incremental ensemble classifier in accordance with an embodiment of the invention.

DETAILED DESCRIPTION OF THE PREFERRED EMBODIMENTS

Figure 1:
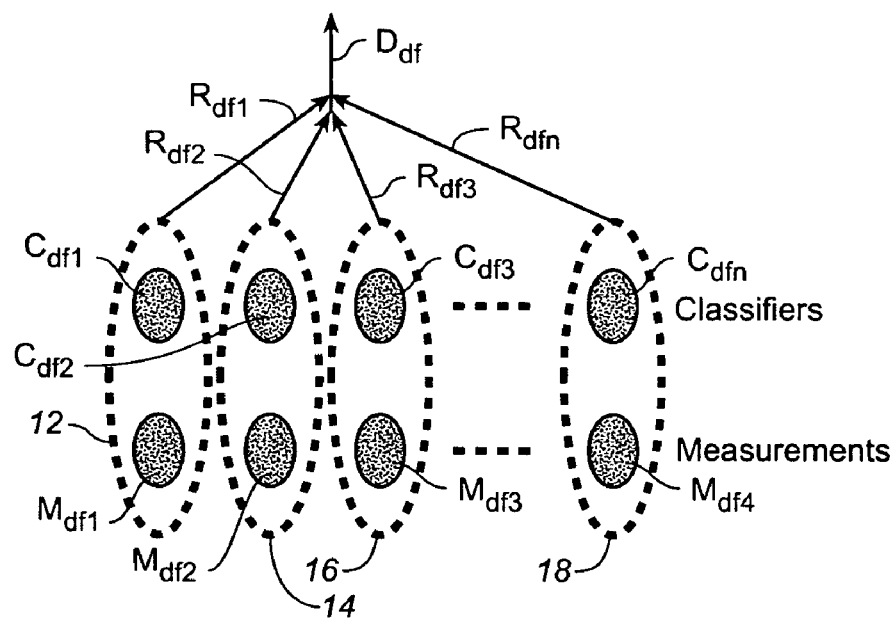
FIG. 1 is an illustrative diagram of a prior decision fusion classifier.
Figure 2:
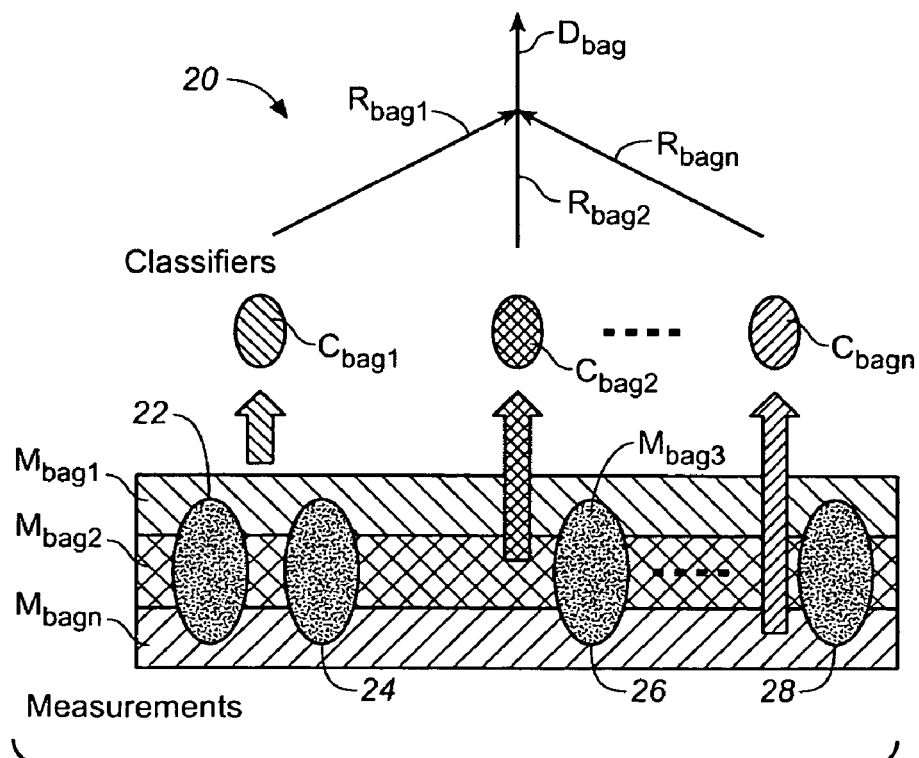
FIG. 2 is an illustrative diagram of a prior measurement fusion classifier using a "bagging" technique.
Figure 3:
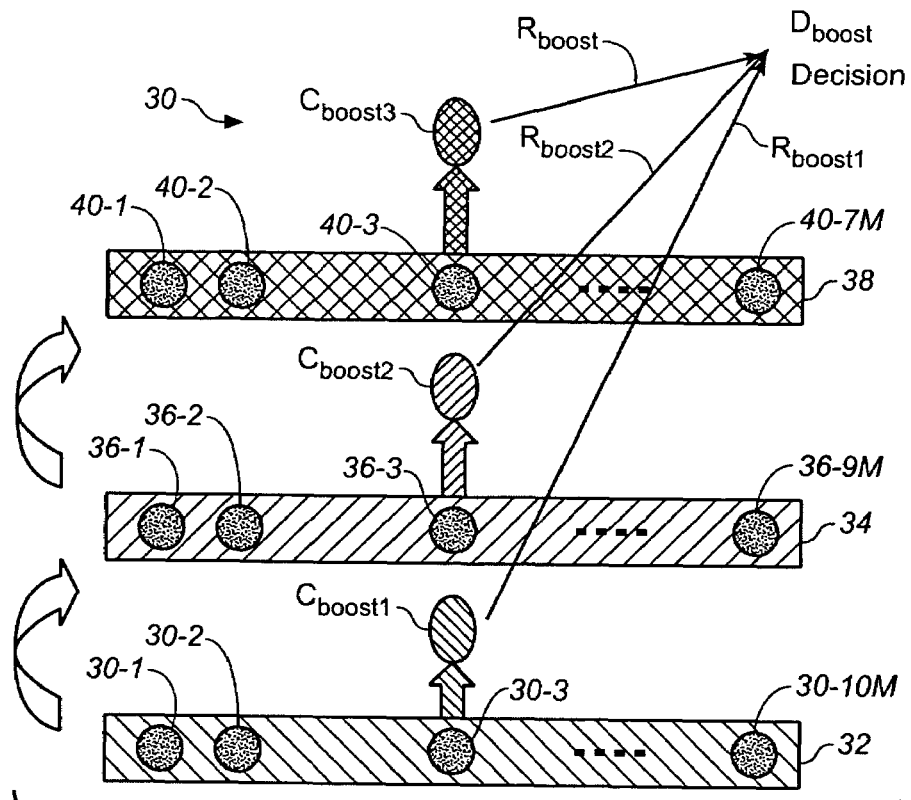
FIG. 3 is an illustrative diagram of a prior measurement fusion classifier using a "boosting" technique.
Figure 4:
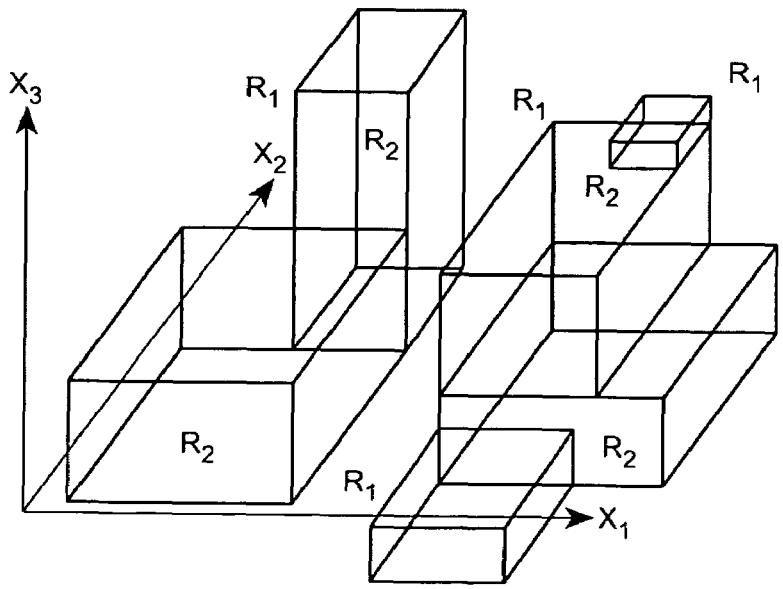
FIG. 4 is an illustrative drawing showing cells of a recorded tree structure in accordance with a prior decision-tree technique.

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of those specific details. In other instances, well-known structures and devices are shown in block diagram from in order not to obscure the description of the invention with unnecessary detail. Thus, the present invention is not intended to be limited to the embodiments shown, but is to be accorded the widest scope consistent with the principles and features disclosed herein.

In one embodiment of the invention, an ensemble classifier is built iteratively to derive and refine a decision by incorporating new information sources as needed or as available. The novel decision scheme is incremental both in the classifier and data dimensions. In one embodiment, an ensemble decision will be recorded in a tree structure, which represents a hierarchical decomposition of a decision (or feature) space.

The following description has two sections. A first section describes a training process to make a novel ensemble classifier. The second section describes use of the ensemble classifier once it has been trained.

TRAINING

As explained above, two problems arise when developing a classifier to work with measurement data that change incrementally. First, a new data source must be selected. Second, a decision process must be modified to accommodate classifications including the new data source.

Selecting a Data Source

In one embodiment a decision as to which data sources to use next incorporates a number of factors, such as cost, accuracy, and usage. For example, economic factors, such as cost and speed, not just accuracy, may be factored into the selection of a new data source. This approach is akin to considering Bayesian risk rather than considering only classification error in source selection. Moreover, a source selection strategy may be employed for leaf and interior nodes and for nodes that are "pure" or "impure."

Generally speaking, the source selection criteria should involve two components: (1) the amount of information that a new source brings in that is relevant, and (2) the amount of information that a new source brings that is redundant. The amount of relevant information is measured by the mutual information between the new source and the ground truth (i.e., the correct classification). The amount of redundant information is measured by the mutual information between the new source and the current aggregate. For the new source, it is desirable that the relevant information content be high while the redundant information content be low, which implies that a ratio of relevant information to redundant information should be maximized. However, the dilemma is that often times, these two requirements can be conflicting (i.e., when the current aggregate classifier is already very accurate, sources that provide highly relevant information may also be the ones that provide highly redundant information). Hence, while both criteria are important, they should be weighed accordingly, depending on the usage situations.

In the interior nodes or nodes that are still impure, one goal is to reduce the impurity. However, using sources with a large amount of relevant information may not be helpful at this stage, if the information also turns out to be highly redundant. This is because, while the new information is relevant, a high degree of redundancy implies that little new substance (beyond what is already known) is added to help disambiguate the current decision. Hence, an impure node most likely will stay that way. The better strategy, would be one that uses a source of small mutual information with the aggregate information sources used so far, while maintaining good relevance to the problem (or large mutual information with the ground truth). Intuitively, this will provide a new "information dimension" to refine the current decision. This corresponds to a discovery phase, which emphasizes the collection of new information at the expense that some information brought in by the new source might not be highly relevant.

For the leaf nodes or nodes that are pure, one goal often is to either confirm or discredit the current conclusion. This may require selection of a source with either a large positive or a large negative correlation with the current aggregate. This corresponds to a validation phase that emphasizes collecting relevant information even though it might be redundant. Redundancy in this case serves as a way to either confirm or discredit the current hypothesis. Finally, all these decisions should be weighted by the particular source's economic factors, such as cost and speed.

For example, consider the two-class problem of distinguishing between suspicious ($\omega_0$) and normal ($\omega_1$) events. Again, for each source s, denote its measurement as $x_s$ and its class assignment over some sample space as a random variable $y_s$. Furthermore, denote the ground truth (i.e., the correct labels) over the same sample space as $y_1$. One algorithm for source selection involves steps I-III as follows.

(I) At the root level (level 0), select the new source as the one that provides the largest mutual information with the ground truth, weighted by the economic factor (e.g., cost) of the source. This selection criterion will ensure that an inexpensive and highly accurate source is used.

Mutual information $I(x|y)$ is a measurement of how much uncertainty of the random variable x remains, given another random variable y. Mathematically, $I(x|y)=H(x)-H(x|y)$, where H is the entropy (or uncertainty) of a random variable and is defined as $H(x)=-\Sigma p(x) \log p(x)$. Hence, mutual information measures the decrease of uncertainty of a random variable given the knowledge of another. If the source $y_s$ can accurately predict the class label $y_t$, then knowing $y_s$ provides significant information on the correct label $y_t$, and hence, it should be used.

(II) For level k, at interior nodes and nodes that are considered impure, select the source that has the small mutual information with the current aggregate, but has large mutual information with the ground truth. i.e., the selected source should maximize $I(y_t|y_k)/I(y_k|y(s_0,s_1,\ldots,s_{k-1}))$, properly weighted by its cost, where $s_k$ is the source selected at level k, and $y(s_0,s_1,\ldots,s_{k-1})$ is the classification results from the current combined aggregate (based on Bayesian rule, to be discussed later).

(III) For level k, at leaf nodes and nodes that are considered pure, select the source that has either the largest (conformation) or smallest (discredit) correlation with $y(s_0, s_1, \ldots, s_{k-1})$, i.e., $$\underset{j}{\mathrm{argmax\,cov}}(y_j, y) = \frac{E[(y_j - \bar{y}_j)(y - \bar{y})]}{\sqrt{E(y_j - \bar{y}_j)^2 E(y - \bar{y})^2}}.$$

Note that with this incremental source selection scheme, the source selection problem can be solved independently for different nodes. This makes it possible to select different sources under different application scenarios, and hence, makes the technique more flexible.

Updating a Decision Process to Accommodate a New Source

The next step in the training process is to incorporate the new data source information into the decision making process. This can either be done in a global (batch) manner or an incremental manner. An incremental scheme is preferred because of its efficiency.

For simplicity, it is assumed that the aggregate label is to be a linear combination of those of the available sources based on certain proper weighting rules. That is, the combined decision rule for the first k sources $s_0, s_1, \ldots, s_{k-1}$ on an unknown sample $X^u=(x_o^u, x_1^u, \ldots, x_{k-1}^u)$ is of the form $$\sum_{i=0}^{k-1} w_i \Phi_i(x_i^u),$$

where $\Phi_i$ is a suitable component classifier. For example, for the radial basis classifiers and kernel-based classifiers, $$\Phi_i(x_i^u) = \sum_{j=0}^{n-1} \alpha_j y_{tj} \phi(x_i^u, x_{ij})$$

where $\phi$ is a suitable basis (or kernel) function and $x_{ij}$ denotes the measurement of the ith source of the jth training sample, $y_{tj}$ is the ground truth label assigned to the jth training sample, and n is the number of training samples. Hence the training goal is to minimize the discrepancy of predicted label with the ground truth $$\sum_{j=0}^{n-1} \left| y_{tj} - \sum_i w_i \Phi_i(x_{ij}) \right|^2$$

for all n samples. Writing this equation is a matrix form, the goal is to minimize the following expression:

$$\left( \begin{bmatrix} \Phi_o(x_{o,o}) & \Phi_1(x_{1,o}) & \cdots & \Phi_{k-1}(x_{k-1,o}) \\ \Phi_o(x_{o,1}) & \Phi_1(x_{1,1}) & \cdots & \Phi_{k-1}(x_{k-1,1}) \\ \cdots & \cdots & \cdots & \cdots \\ \Phi_o(x_{o,n-1}) & \Phi_1(x_{1,n-1}) & \cdots & \Phi_{k-1}(x_{k-1,n-1}) \end{bmatrix} \begin{bmatrix} w_0 \\ w_1 \\ \vdots \\ w_{k-1} \end{bmatrix} - \begin{bmatrix} y_{t0} \\ y_{t1} \\ \vdots \\ y_{tm-1} \end{bmatrix} \right)^T$$

$$\left( \begin{bmatrix} \Phi_o(x_{o,o}) & \Phi_1(x_{1,o}) & \cdots & \Phi_{k-1}(x_{k-1,o}) \\ \Phi_o(x_{o,1}) & \Phi_1(x_{1,1}) & \cdots & \Phi_{k-1}(x_{k-1,1}) \\ \cdots & \cdots & \cdots & \cdots \\ \Phi_o(x_{o,n-1}) & \Phi_1(x_{1,n-1}) & \cdots & \Phi_{k-1}(x_{k-1,n-1}) \end{bmatrix} \begin{bmatrix} w_o \\ w_1 \\ \vdots \\ w_{k-1} \end{bmatrix} - \begin{bmatrix} y_{t0} \\ y_{t1} \\ \vdots \\ y_{tm-1} \end{bmatrix} \right)$$

The solution to this problem is well established as $$\begin{bmatrix} \Pi_o \cdot \Pi_o & \Pi_0 \cdot \Pi_1 & \cdots & \Pi_o \cdot \Pi_{k-1} \\ \Pi_1 \cdot \Pi_o & \Pi_1 \cdot \Pi_1 & \cdots & \Pi_1 \cdot \Pi_{k-1} \\ \cdots & \cdots & \cdots & \cdots \\ \Pi_{k-1} \cdot \Pi_o & \Pi_{k-1} \cdot \Pi_1 & \cdots & \Pi_{k-1} \cdot \Pi_{k-1} \end{bmatrix} \begin{bmatrix} w_0 \\ w_1 \\ \vdots \\ w_{k-1} \end{bmatrix} = \begin{bmatrix} \Pi_0 \cdot Y_t \\ \Pi_1 \cdot Y_t \\ \vdots \\ \Pi_{k-1} \cdot Y_t \end{bmatrix}$$

or $A^{(k)}W^{(k)}=b^{(k)}$ where $\Pi_i=[\Phi_i(x_{i,0}), \Phi_i(x_{i,1}), \ldots, \Phi_i(x_{i,n-1})]^T, 0 \leq i < k$, $Y_t=[y_{t0}, y_{t1}, \ldots, y_{tm-1}]^T$ and n is the number of training samples available. Now if an additional source is added as a result of the selection process outlined above. A row and a column can be appended to the previous equation to arrive at $$\begin{bmatrix} A^{(k)} & C^{(k)} \\ C^{(k)T} & D^{(k)} \end{bmatrix} \begin{bmatrix} W^{(k)\prime} \\ W^{(kl)} \end{bmatrix} = \begin{bmatrix} b^{(k)} \\ b^{(kl)} \end{bmatrix},$$

where $C^{(k)}$ is a k by 1 column vector $[\Pi_o \cdot \Pi_k, \Pi_1 \cdot \Pi_k, \ldots, \Pi_{k-1} \cdot \Pi_k]^T$, $D^{(k)}$ is $\Pi_k \cdot \Pi_k$ and $b^{(k l)}$ is $\Pi_k \cdot Y_t$. Then by simple substitution, one can easily show that $$W^{(k)\prime} = \left(1 + \frac{A^{(k)-1} C^{(k)} C^{(k)T}}{D^{(k)} - C^{(k)T} A^{(k)-1} C^{(k)}}\right) W^{(k)} - \frac{A^{(k)-1} C^{(k)}}{D^{(k)} - C^{(k)T} A^{(k)-1} C^{(k)}} b^{(kl)}$$

$$W^{(kl)} = \frac{b^{(kl)} - C^{(k)T} W^{(k)}}{D^{(k)} - C^{(k)T} A^{(k)-1} C^{(k)}}$$

or in a matrix form $$\begin{bmatrix} W^{(k)\prime} \\ W^{(kl)} \end{bmatrix} = \begin{bmatrix} \left(1 + \dfrac{A^{(k)-1}C^{(k)}C^{(k)T}}{D^{(k)} - C^{(k)T}A^{(k)-1}C^{(k)}}\right) & \dfrac{A^{(k)-1}C^{(k)}}{D^{(k)} - C^{(k)T}A^{(k)-1}C^{(k)}} \\ \dfrac{-C^{(k)T}}{D^{(k)} - C^{(k)T}A^{(k)-1}C^{(k)}} & \dfrac{1}{D^{(k)} - C^{(k)T}A^{(k)-1}C^{(k)}} \end{bmatrix} \begin{bmatrix} W^{(k)} \\ b^{(kl)} \end{bmatrix}$$

It will be appreciated that this is the update equation that is commonly used in adaptive filtering algorithm, for example. The most computationally expensive operation in the above update scheme is the computation of the matrix inverse of $A^{(k)}$, which is of complexity $O(k^3)$ if computed from scratch through, say, Cholesky decomposition, for example. However, if $A^{(k)}$ has already been computed at the previous step, then to compute $A^{(k+1)}$ can be performed relatively efficiently in complexity $O(k^2)$ time. Thus, the approach described above provides an efficient way to update a decision process involving an ensemble classifier when a new information source is added.

Alternatively, if the new sources have little correlation with the existing sources (or $C^{(k)}$ is close to zero), then the equations have a much simplified form which resembles those of recursive least square and Kalman filter.

$$W^{(k)\prime} = W^{(k)}$$

$$W^{(kl)} = \frac{1}{D^{(k)}} b^{(kl)}$$

Basically, the new source is decomposed into two components: one whose information is already available in the existing aggregate and the other that is new. The redundant information that the new source carries does not change any decision. The new information will be used based on the amount of correlation with the ground truth. This implies that the new source should not be used directly. Instead, only the component in the new source that is orthogonal to the current aggregate need to be extracted and used in the update process. Computationally, this corresponds to apply Gram-Schmit diagonalization to $X_k$ to generate $$\Pi_k' = \Pi_k - \sum_i \frac{\Pi_k \cdot \Pi_i'}{|\Pi_i' \cdot \Pi_i'|} \Pi_i',$$

and use $\Pi_k'$ instead of $\Pi_k'$. The Gram-Schmit process makes all $A^{(k)}$ diagonal, and hence, the solution of new $W_k$ can be in constant time. The Gram-Schmit process has again a complexity of $O(n^2)$. Hence an iterative update process as taught above has a total complexity of $O(n^2)$, which is one order of magnitude less than the batch update method of $O(n^3)$.

Pseudo-Code Training Algorithm

The following is an example pseudo-code for training algorithm by which new sources are selected for addition to a decision process in accordance with an embodiment of the invention.

(1) Definitions:

$\overline{\omega}_0, \ldots, \overline{\omega}_{l-1}$: Decisions, l is the max number of decisions $s_0, s_1, \ldots, s_{k-1}$: Sources, k is the max number of sources $w_0, \ldots, w_{k-1}$: Weights, k is the max number of sources $D = \{(X_o, y_{to}), (X_1, y_{t1}), \ldots, (X_{n-1}, y_{m-1})\}$: Training data, n is the number of training samples $X_i = (x_{o,i}, x_{l,i}, \ldots, x_{k-1,i})$ are the measurements from the k sources, and $y_{ti}$ is the ground truth decision (treated as a random variable over the space of D)

$y(s_0, s_l, \ldots, s_{m-1})$: Decision (treated as a random variable over the space of D) reached by using the first m sources (2) Initialization:

(i) Select as first source $s_0$ the source whose decision has the largest mutual information with the ground truth, weighted by the source's economic factor.

(ii) Set the source's weighting factor as 1.

(iii) Use $s_0$ to partition D into l groups, corresponding to l different decisions.

(iv) Construct a tree with D at the root, and the l different decision groups as leaves.

(v) Repeat until no split occurs or all sources have been used:

(3) Achieving Node Purity: For each node at the leaf level, (i) If the training data in the node are considered pure, stop further processing (ii) If the training data in the node are considered impure.

(iii) Select a new source whose decision has the largest ratio of mutual information with the ground truth over mutual information with the current decision, weighted by the source's economic factor.

(iv) Update the weighting factors of the existing sources and generate the weighting factor of the new source.

(v) Use the new aggregate decision rule to partition data in the current node into l groups, corresponding to l different decisions (vi) Partition the current nodes l ways with l different decision groups as leaves (4) Achieving Necessary Validation: If the training data in the node needs further validation, (i) Select a new source whose decision has either the largest (conformation) or smallest (discredit) correlation with the current decision, weighted by the source's economic factor.

(ii) Update the weighting factors of the existing sources and generate the weighting factor of the new source.

(iii) Use the new aggregate decision rule to partition data in the current node into l groups, corresponding to l different decisions.

(iv) Partition the current nodes l ways with l different decision groups as leaves.

In the first IF statement (under step (3)) in the above algorithm, the term "pure" implies that the mutual information between the labels assigned by the current ensemble classifier and the ground true correspond well. For example, assume that the decision process involves determining whether to issue a credit card to a person based upon whether the person is a high or low credit risk. Further, assume that a classifier uses a person's income as an indicator of whether or not to issue a credit card to the person (e.g., high income, yes, low income, no). If a bank has, for instance, 10 million existing customers with known income and credit risk (i.e., ground truth), then the classifier will put them into two categories based on a person's income. Assume for the purpose of this example that high-income customers often times also have low credit risks; and that persons classified as having high incomes almost always have a low credit risk. Hence, the node is "pure" (mostly containing samples of the same ground truth label as "low risks"). However, low incomes do not necessarily imply high risks. Hence, persons assigned to a credit denied category can have either high or low risks. Hence, that particular node is "impure" because there is a good mixture of high and low-risk cases.

In the second IF statement (under step (4)) in the above algorithm, a determination is made as to whether further "validation" is required. For example, usually, when the node is already "pure" (or the current ensemble classifier already predicts the ground truth well), an additional classifier nevertheless may be selected (e.g., just to be on the safe side a bank insists on a minimum of five different data sets be acquired to make a credit decision, regardless if a person has a high FICA score) to provide more sources to query. Thus, in the case that a node is already pure and yet for some reason further validation is required, it already is known that the source selected will provide large redundant information (because a good source should match the ground truth, but then it will match the current ensemble decision as well). Hence, the same selection criterion used for an "impure" node cannot be used. Instead, at this juncture, the objective is to either confirm or discredit the current decision results. Positive correlation is for confirming and negative correlation is for discrediting the current results. For example, if based on the FICA score, a bank decides to issue credits, but for procedural reasons the bank insists on one more data item for validation. Supposed that it is known that high income usually correlates well with issuing credits and high debt usually correlates with not issuing credits, then check can be made as to either the income or the debt of a person to either confirm or discredit the current decision based on FICA score.

INCREMENTALLY ADAPTIVE ENSEMBLE CLASSIFIER

FIGS. 5A-5C are an illustrative diagrams of an adaptive incremental ensemble classifier in accordance with an embodiment of the invention. It will be appreciated that the adaptive incremental ensemble classifier can be encoded in computer readable medium for use in processing by a digital processing system. FIG. 5A shows a first configuration of the ensemble classifier 500 comprising a set of one or more first classifiers 502 and a set of one or more first data measurement sources 504. It will be appreciated that each spot labeled 502 may represent multiple classifiers, and that each spot labeled 504 may represent multiple data sources. Each respective classification result is associated with a respective first predetermined weight arrived at through a training process. The first configuration 500 produces a decision D1 based upon classifications reached by the one or more classifiers 502 in response to data input from the one or more data sources 504. The decision D1 for any given subject depends upon results reached by the respective first classifiers 502 and the first weights associated with the respective first classifiers.

Based upon a decision reported at D1, a determination is made as to whether to incrementally expand the ensemble classifier to a second configuration 505 shown in FIG. 5B. If for a given subject (such as a person applying for a credit card), D1 has a predetermined, highly confident classification result, then there is no expansion of the ensemble to the second configuration 506. On the other hand if D1 has different predetermined results for different training samples, then the classifier is expanded to add one or more additional classifiers and one or more additional data sources. For example, using the credit card applicant example, one determination at D1 could be that a person has high net, and in response to that determination, there could be a decision to grant the credit card at this juncture without further analysis, and therefore to not incrementally change the classifier ensemble to add additional classifiers and sources. Alternatively, another determination at D1 could be that a person is not high net worth, in which case a determination could be made to gather more information about the credit card applicant, which would involve incrementally changing the ensemble classifier to gather and classify more information.

Referring to FIG. 5B, assuming that decision D1 results in an expansion of the ensemble, the second classifier ensemble configuration 506 includes the set of one or more first classifiers 502, the set of one or more first data sources 504. It also includes a second set of one or more second classifiers 508 and a set of one or more second data sources 510. Each respective classification result in the second classifier configuration 506 is associated with a respective predetermined second weight arrived at through a training process. The second weights can be arrived at, for example, using the updating decision process described above, for instance. It will be appreciated that respective second weights as associated with respective first classifiers 502 used in the second configuration 506 shown in FIG. 5B, are different from respective first weights associated with those same classifiers 502 in the first configuration 500 shown in FIG. 5A. That is, classifier weights have been changed or updated so as to incrementally change the decision process to accommodate the second one or more classifiers 508 and the second one or more data sources 510. The second configuration 506 produces a decision D2 based upon classifications reached by the one or more first and second classifiers 502 and 508 in response to data input from the one or more first and second data sources 504 and 510. The decision D2, for any given subject, depends upon results of respective classifications by classifiers 502 and 508 and the second set of weights respectively associated with those classifiers in the second classification configuration 506.

Depending upon the decision result at D2, the classifier ensemble may be expanded to a third classifier configuration 512 shown in FIG. 5C. For example, building on the credit card example, decision D2 may report that the credit card applicant is both not high net worth, but has very low debt, in which case a determination may be made to issue a credit card without considering any additional data sources or classifications. On the other hand, decision D2 may report that the applicant is not high net worth and does not have very low debt, in which case, the classification ensemble is expanded incrementally to add one or more third classifiers 514 and one or more third data sources 516.

Assuming that decision D2 results in an expansion of the ensemble, the third classifier ensemble configuration 512 includes the set of one or more first and second classifiers 502, 508 and the set of one or more first and second data sources 504, 510. It also includes a set of one or more third classifiers 514 and a set of one or more third data sources 516. Each respective classification result in the third classifier configuration 512 is associated with a respective predetermined third weight arrived at through a training process. The third weights can be arrived at, for example, using the updating decision process described above, for instance. It will be appreciated that respective third weights associated with respective first and second classifiers 502, 508 used in the third configuration 512 shown in FIG. 5C, are different from respective second weights associated with those same classifiers 502, 508 in the second configuration 506 shown in FIG. 5B. That is, classifier weights have been changed or updated so as to incrementally change the decision process to accommodate the third one or more classifiers 514 and the third one or more data sources 516. The third configuration 512 produces a decision D3 based upon classifications reached by the one or more first, second and third classifiers 502, 508 and 514 in response to data input from the one or more first, second and third data sources 504, 510 and 516. The decision D3, for any given subject, depends upon results of respective classifications by classifiers 502, 508 and 514 and the third set of weights respectively associated with those classifiers in the third classification configuration 512.

It will be appreciated that the process of expanding the ensemble classifier can continue. Thus, an adaptive ensemble classifier incrementally changes data source and classification decisions based upon decisions reached during the classification process. Alternatively, the adaptive classifier may incrementally reconfigured to add classification modules and data sources as they become available rather than based upon the outcome of a classification process. Continuing with the credit card application example, if a data concerning prior credit card fraud becomes available for a credit card applicant, then the classification process might be reconfigured to use that data regardless of prior classification-based decisions.

Moreover, in reviewing the sequence of classifier additions shown FIGS. 5A-5C, it will be appreiated that a the structure of FIG. 5C, in particular, illustrates a decision process sturcture used to guide the adaptive process of incrementally expanding the ensemble. Furthermore, it will be appreciated that the decsion process, in essences, a decision-tree, and that different sets of weights are associated with different branches of the tree.

Figure 6:
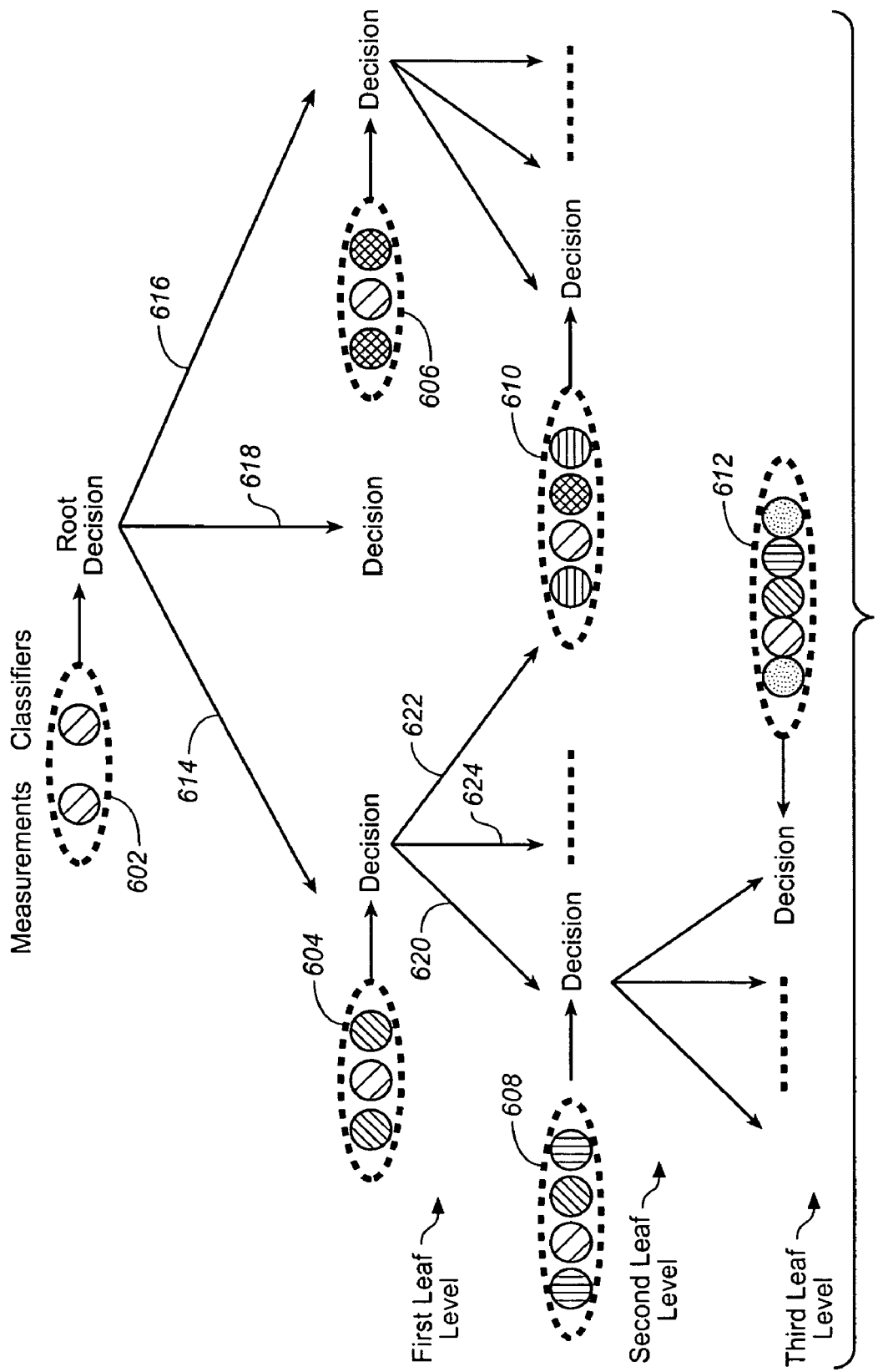
FIG. 6 is an illustrative drawing of an adaptive classifier in accordance with another embodiment of the invention.

FIG. 6 is an illustrative drawing of part of an adaptive classifier in accordance with another embodiment of the invention. The classifier has a tree-structure. A first set of one or more classifiers and data sources 602 is associated with a root node of the tree structure. A second set of one or more classifiers and data sources 604 is associated with a left-most first level leaf node. A third set of one or more classifiers and data sources 606 is associated with a right-most left-most level leaf node. A fourth set of one or more classifiers and data sources 608 is associated with a left-most second level leaf node. A fifth set of one or more classifiers and data sources 610 is associated with a right-most second level leaf node. A seventh set of one or more classifiers and data sources 612 is associated with a left-most third level leaf node of the tree structure. It will be appreciated that the tree structure may have additional branches and leaf nodes which have not been shown in order to not over-complicate the drawing.

The tree structure indicates a branching decision process whereby the adaptive classifer 600 is adaptively configured based upon decision results. Three decisions are possible at each decision node in this example. For example, referring to the root node associated with the first set of classifiers and data sources 602, if a first decision is reached then path 614 is followed, and the second set of one or more classifiers and data sources 604 is added. If a second decision is reached then path 616 is followed, and the third set of one or more classifiers and data sources 606 is added. If a third decision is reached then path 618 is followed, and the classification process terminates.

Referring to the second set of one or more classifiers and data sources 604 at the first (left-most) first level node of the tree structure, if a first decision (different from the root node first decision) is reached then branch 620 is followed, and the fourth set of one or more classifiers and data sources 608 is added. If a second decision is reached then branch 622 is followed, and the fifth set of one or more classifiers and data sources 610 is added. If a third decision is reached then branch 624 is followed, and the classification process terminates.

A person skilled in the art will appreciate that the tree-structure represents one example of a decision process that can be used to dynamically reconfigure the adaptive classifer 600 into any of numerous configurations based upon decision results.

Each configuration is associated with predetermined weights. The following weights chart lists sets of weights associated with different classifier configurations. It will be understood that a given set of one or more classifiers and weights is associated with a different pre-trained set of weights when used in different classifier configurations.

| Weights Sets Chart | |
| --- | --- |
| Configuration | Weight Set |
| 602 | First Weight Set |
| 602 + 604 | Second Weight Set |
| 602 + 606 | Third Weight Set |
| 602 + 604 + 608 | Fourth Weight Set |
| 602 + 604 + 610 | Fifth Weight Set |
| 602 + 604 + 610 + 612 | Sixth Weight Set |

Thus, the adaptive classifier of FIG. 6 is associated with a decision process, represented by the tree structure, adaptive classifier/data sources 602-612 and predetermined weights illustrated in the above chart. It will be appreciated that the tree structure classifiers and weights may be encoded in computer readable media for use processing by a computer system. Moreover, it will appreciated that sets of weights are, in essence associated with a decision branch of the decision-tree. For example, the fourth set of weights is associated with branch 620, and the fifth set of weights is associated with branch 622.

Figure 7:
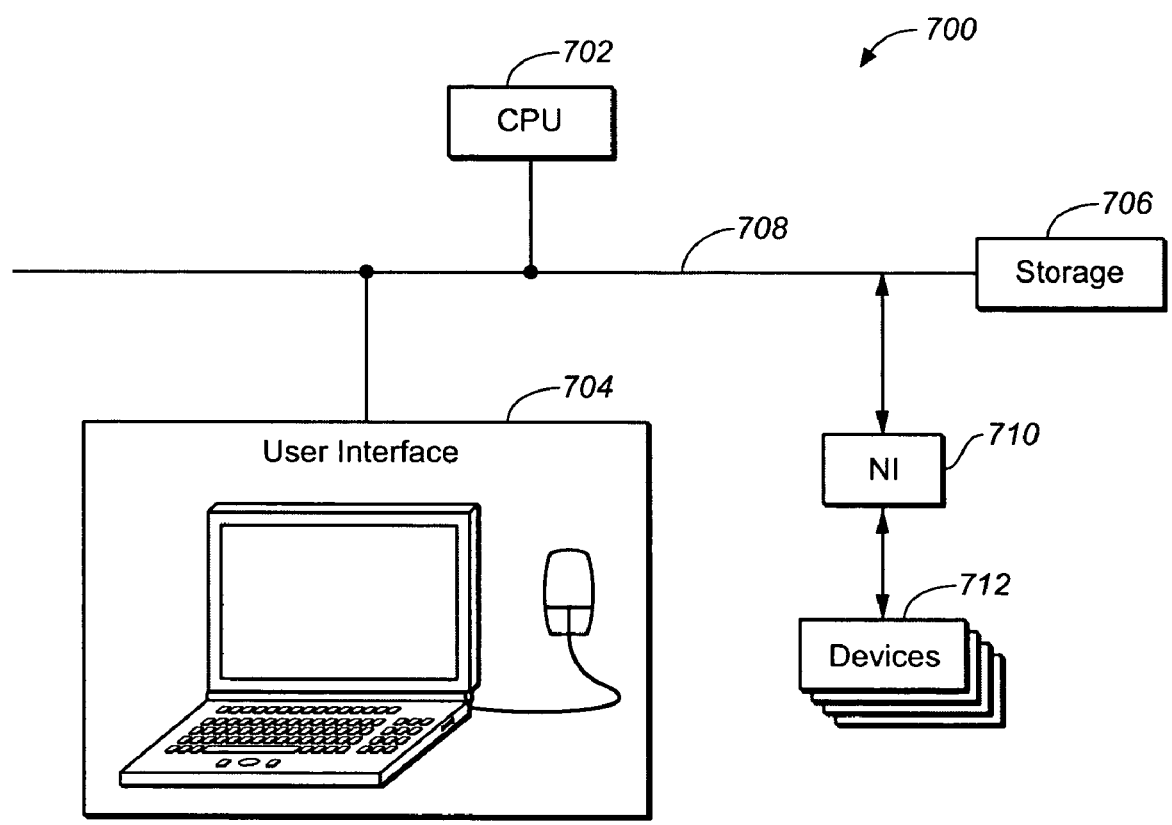
FIG. 7 is a schematic drawing of an illustrative computer system that can be programmed to serve as an adaptive classification system in accordance with an embodiment of the invention.

FIG. 7 is a schematic drawing of an illustrative computer system 710 that can be programmed to serve as an adaptive classification system in accordance with an embodiment of the invention. The computer system 710 includes one or more central processing units (CPU's) 712, a user interface 714, computer readable storage media 716, a system bus 718, and one or more bus interfaces for connecting the CPU, user interface, memory and system bus together. The computer system also includes a network interface 720 for communicating with other devices 722 on a computer network. For example, information structures such as weighing matrices and decision-tree structures and classifier modules may be provided, via bus 718, from interface 714, storage 716 or other devices 722, so as to be available from storage 716 to perform classification functions using CPU 712.

While the invention has been described with reference to various illustrative features, aspects and embodiments, it will be appreciated that the invention is susceptible of various modifications and other embodiments, other than those specifically shown and described. The invention is therefore to be broadly construed as including all such alternative variations, modifications and other embodiments within the spirit and scope as hereinafter claimed.

What is claimed is:

1. A computer implemented adaptive classification method comprising:
   receiving information from one or more first data sources;
   producing at least one first classification result using a processor programmed with one or more first classifiers and the information received from the one or more first data sources;
   producing a first decision using the processor programmed with the at least one first classification result and a first set of one or more respective weights respectively associated with the one or more first classifiers;
selecting at least one second classifier if the first decision has a first prescribed value;
receiving information from one or more second data sources;
producing at least one second classification result using the processor programmed with one or more first classifiers and the at least one second classifier and the information received from the one or more first data sources and the information received from the at least one second data source;
producing a second decision using the processor programmed with the at least one second classification result and a second set of one or more respective weights respectively associated with the one or more first classifiers and with the at least one second classifier; and
outputting an indication of the second decision from the processor.

2. The method of claim 1 further including:
terminating the classification process if the first decision has a second prescribed value.

3. The method of claim 1 further including:
selecting at least one third classifier if the first decision has a second prescribed value;
producing at least one third classification result using the one or more first classifiers and the at least one third classifier and the one or more first data sources and at least one third data source; and
producing a third decision using the at least one second classification result and a third set of one or more respective weights respectively associated with the one or more first classifiers and with the at least one third classifier.

4. The method of claim 3 further including:
selecting at least one fourth classifier if the third decision has a first prescribed value;
producing at least one fourth classification result using the one or more first classifiers, the at least one third and the at least one fourth classifiers and the one or more first and third data sources and at least one fourth data source;
producing a fourth decision using the at least one fourth classification result and a fourth set of one or more respective weights respectively associated with the one or more first classifiers and with the at least one third and the at least one fourth classifiers.

5. The method of claim 3 further including:
terminating the classification process if the third decision has a second prescribed value.

6. A computer implemented adaptive ensemble object classifier comprising:
a plurality of classifiers, each of the classifiers operable to input data from one or data sources concerning characteristics of an object to be classified, and to produce respective classification outputs;
a plurality of sets of weights associated with the classification outputs to produce object classification decisions from weighted combinations of outputs from the classifiers;
a decision structure that specifies, based on a given object classification decision of one of the weighted combinations of the classifiers, a further classifier combination for producing a further object classification decision, the further classifier combination involving an additional classifier, an additional data source, and a set of weights including weights additional to or different from the set of weights used to produce the given object classification decision;
an interface operable for outputting the further object classification decision as a decision concerning classification of the object.

7. The adaptive ensemble classifier of claim 6,
wherein the decision structure maps respective classifier combinations to respective sequences of classification decision results.

8. The adaptive ensemble classifier of claim 6,
wherein the decision structure comprises a tree-structure.

9. The adaptive ensemble classifier of claim 6,
wherein the decision structure comprises a tree-structure; and
wherein each respective classifier combination is associated with one or more branches of the tree structure.

10. The adaptive ensemble classifier of claim 6,
wherein the decision structure comprises a tree-structure; and
wherein respective sets of weights are associated with respective branches of the tree structure.

11. An adaptive object classification method to produce a classification of an object, comprising:
receiving first information concerning one or more characteristics of an object to be classified;
producing at least one first classification result with one or more first classifiers using the first information;
producing a first object classification decision using the at least one first classification result and a first set of weights respectively associated with the one or more first classifiers; and
in response to the first object classification decision having a first prescribed value,
selecting one or more second classifiers that use second information concerning one or more further characteristics of the object to be classified,
producing at least one second object classification result using the one or more first classifiers, the first information, the one or more second classifiers, and the second information,
producing a second object classification decision using the second object classification result and a second set of weights, differing from the first set of weights, the weights of the second set respectively associated with classifiers from both the one or more first classifiers and the one or more second classifiers, and
outputting the second object classification decision as an indication of classification of the object.

12. An adaptive network intrusion detection method, comprising:
receiving first input from a first set of network surveillance modules;
producing at least one first classification result with one or more first classifiers using the first input;
producing a first network intrusion decision using the at least one first classification result and a first set of weights respectively associated with the one or more first classifiers; and
in response to the first network intrusion decision having a first prescribed value,
selecting one or more second classifiers that use second input from a second set of network surveillance modules,
producing at least one second classification result using the one or more first classifiers, the first information, the one or more second classifiers, and the second input,
producing a second network intrusion decision using the second classification result and a second set of weights, differing from the first set of weights, the weights of the second set respectively associated with classifiers from both the one or more first classifiers and the one or more second classifiers, and outputting the second network intrusion decision as an indication of a detected network intrusion.

13. An adaptive method for approving extension of credit, comprising:

receiving first input concerning first credit worthiness criteria of an entity or a person;

producing at least one first credit classification result with one or more first classifiers using the first input;

producing a first credit extension decision using the at least one first classification result and a first set of one or more weights respectively associated with the one or more first classifiers; and in response to the first credit approval decision having a first prescribed value, selecting one or more second classifiers that use second input concerning second credit worthiness criteria, producing at least one second classification result using the one or more first classifiers, the first information, the one or more second classifiers, and the second input, producing a second credit approval decision using the second classification result and a second set of weights, differing from the first set of weights, the weights of the second set respectively associated with classifiers from both the one or more first classifiers and the one or more second classifiers, and outputting an indication of the second credit approval decision as an indication of whether to extend credit to the entity or the person.

* * * * *